(12) United States Patent
Barre et al.

(10) Patent No.: US 7,683,137 B2
(45) Date of Patent: Mar. 23, 2010

(54) COLOR REDUCTION POLYETHYLENE MODIFIED BY RADICAL INITIATION

(75) Inventors: Vincent Henri Barre, Jacksonville, FL (US); Tim J. Coffy, Houston, TX (US); Cyril Chevillard, Dickinson, TX (US)

(73) Assignee: Fina Technology, Inc., Houston, TX (US)

( * ) Notice: Subject to any disclaimer, the term of this patent is extended or adjusted under 35 U.S.C. 154(b) by 1183 days.

(21) Appl. No.: 11/174,854

(22) Filed: Jul. 5, 2005

(65) Prior Publication Data

US 2007/0009691 A1  Jan. 11, 2007

(51) Int. Cl.
*C08F 8/06* (2006.01)
*C08F 210/02* (2006.01)

(52) U.S. Cl. .................. 525/333.8; 525/333.7; 525/388; 526/352

(58) Field of Classification Search .............. 525/333.8, 525/333.7, 388; 526/352
See application file for complete search history.

(56) References Cited

U.S. PATENT DOCUMENTS 5,962,598 A * 10/1999 Mack et al. .............. 525/333.8

FOREIGN PATENT DOCUMENTS

EP          1 016 511 A1     7/2000

OTHER PUBLICATIONS

Total Petrochemicals Technical Data Sheet for HDPE 2285, Oct. 2004.
Total Petrochemicals Technical Data Sheet for HDPE 2290, Oct. 2004.

* cited by examiner

*Primary Examiner*—Robert D. Harlan
(74) *Attorney, Agent, or Firm*—Terry R. Krueger

(57) ABSTRACT

Polyethylene modified by using radical initiators such as oxygen and peroxides sometimes has a yellow color which may be reduced or eliminated by incorporating additives such as polyethylene glycol, and/or neutralizing species such as alkali metal stearates, particularly calcium stearate, and zinc oxide.

8 Claims, 8 Drawing Sheets

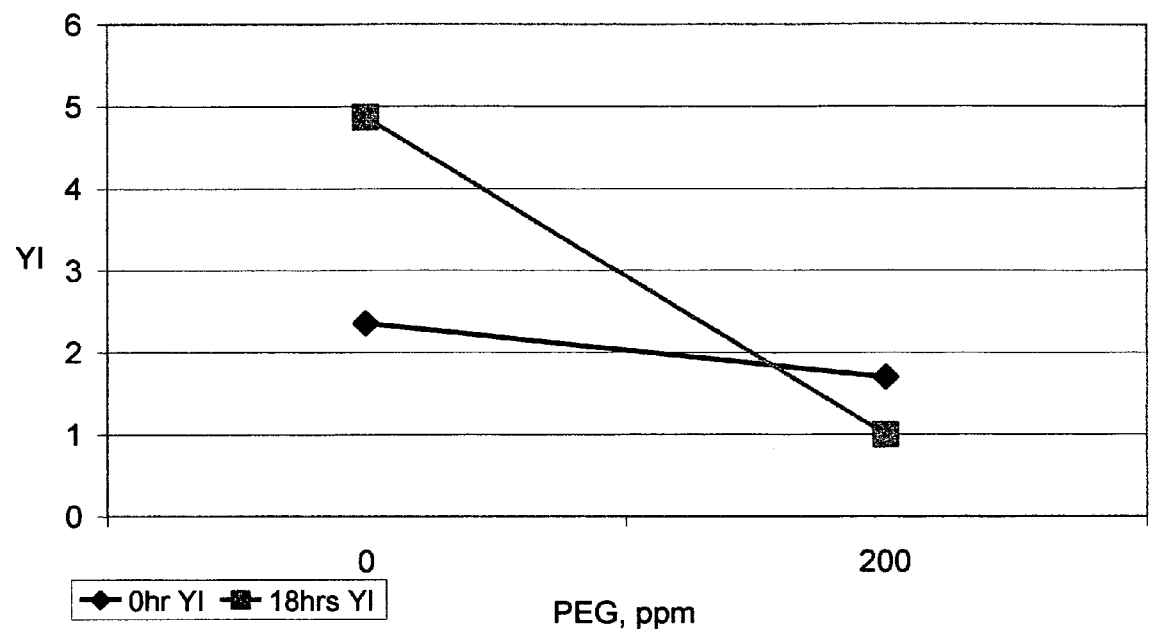

COLOR REDUCTION POLYETHYLENE MODIFIED BY RADICAL INITIATION

FIELD OF THE INVENTION

The invention is related to methods and compositions useful to improve the manufacture of sheets or blown films containing polyethylene. It relates more particularly to methods for improving the color characteristics of polyethylene sheets or films.

BACKGROUND OF THE INVENTION

Among the different possible ways to convert polymers into films, the blown film process with air-cooling is probably the most economical and also the most widely used. This is because films obtained by blowing have a tubular shape which makes them particularly advantageous in the production of bags for a wide variety of uses (e.g. bags for urban refuse, bags used in the storage of industrial materials, for frozen foods, carrier bags, etc.) as the tubular structure enables the number of welding joints required for formation of the bag to be reduced when compared with the use of flat films, with consequent simplification of the process. Moreover, the versatility of the blown-film technique makes it possible, simply by varying the air-insufflation parameters, to obtain tubular films of various sizes, therefore avoiding having to trim the films down to the appropriate size as is necessary in the technique of extrusion through a flat head.

Currently over 21 billion pounds of plastics are used in the U.S. each year for packaging. High density polyethylene (HDPE) blown films represent a substantial portion of this total. The blown film process is a diverse conversion system used for polyethylene. ASTM defines films as being of less than 0.254 mm (10 mils) in thickness; however, the blown film process may produce materials as thick as 0.5 mm (20 mils). It is important to produce HDPE films having high melt strength, good mechanical properties, and ease of processing that enable blown extrusion in structures with good bubble stability.

In order to increase the blown film bubble stability of bimodal polyethylene film material, the addition of peroxides in the extrusion system induces long chain branching (LCB) and improves the processing performance. Other free radical initiators such as oxygen may be used. The resulting color of the materials may be very yellow under some processing conditions. The processing window for yellowness is narrower when peroxides are used.

Several applications for HDPE include, but are not limited to, industrial bags, bags for frozen foods, carrier bags, heavy-duty shipping sacks, mailing envelopes, shrink films, among others. There is a constant need for materials having improved properties for particular applications.

It would be desirable if methods could be devised or discovered to provide polyethylene film or sheet materials having improved properties, particularly reduced color, such as reduced yellow color.

SUMMARY OF THE INVENTION

There is provided, in one form, a method for producing polyethylene having reduced color that involves polymerizing ethylene monomer in the presence of at least one free radical initiator as a polymerization mixture, as well as incorporating into the polymerization mixture an additive in an amount effective to reduce color of the polyethylene product. The additive may be alcohols, glycols, polyethylene glycol (PEG), polyols or water steam, and/or a neutralizing species that may be an alkali metal stearate, an alkali earth metal stearate, zinc stearate, calcium oxide or zinc oxide, and combinations thereof.

In another embodiment, there is provided polyethylene having reduced color made by a process involving polymerizing ethylene monomer in the presence of at least one free radical initiator as a polymerization mixture, as well as incorporating into the polymerization mixture an additive in an amount effective to reduce color of the polyethylene. The additive may be polyols such as polyethylene glycol (PEG) glycols or alcohols or water steam, and/or a neutralizing species such as calcium oxide, zinc oxide or an alkali metal stearate such as zinc stearate, calcium stearate. In further embodiments, there is provided an article of manufacture from this polyethylene, such as a film, fiber, or a blow-molded or injection molded article.

BRIEF DESCRIPTION OF THE DRAWINGS

FIG. 8 is a graph of the Yellow Index as a function of polyethylene glycol measured immediately and after 18 hours.

DETAILED DESCRIPTION OF THE INVENTION

Figure 1:
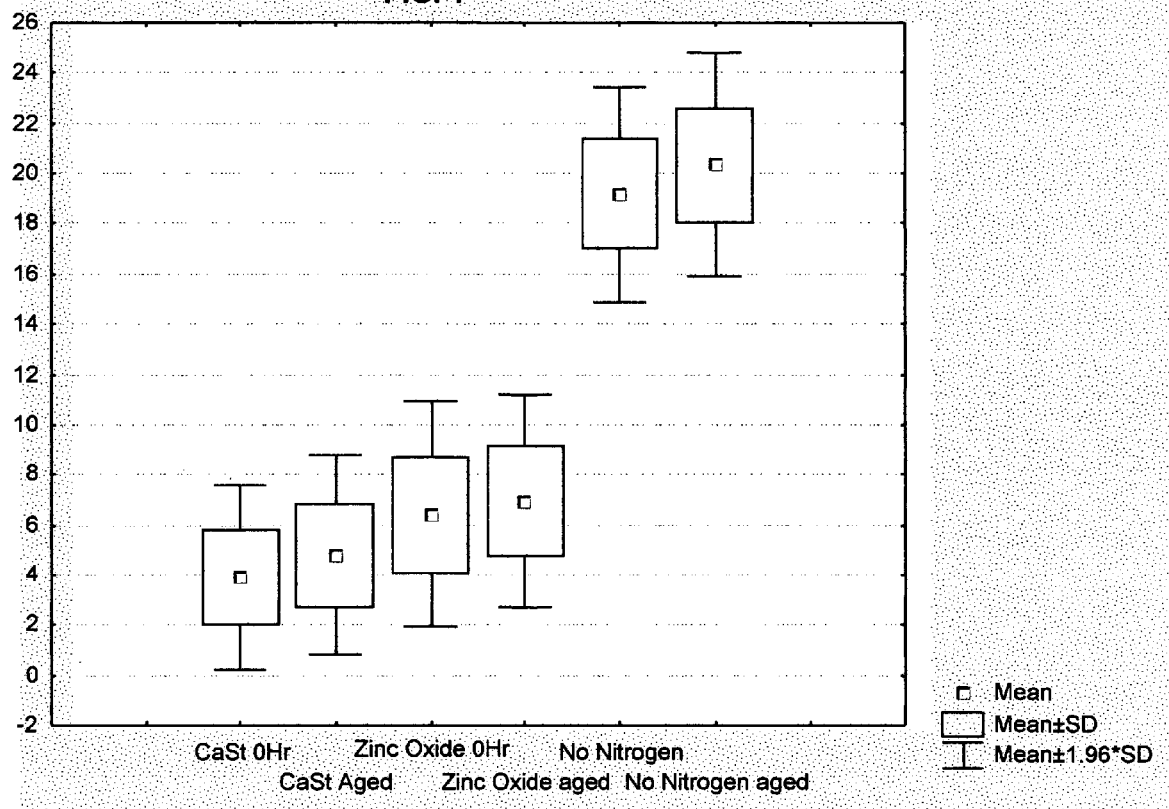
FIG. 1 is a "bow and whisker" plot for the average Yellow index for the design of experiments (DOEs) and examples with calcium stearate and zinc oxide.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology. Various terms as used herein are shown below. To the extent a term used in a claim is not defined below, it should be given the broadest definition persons in the pertinent art have given that term as reflected in printed publications and issued patents.

Certain polymerization processes disclosed herein involve contacting polyolefin monomers with one or more catalyst systems to form a polymer. Such polymers may be used to form polymer articles.

Catalyst Systems

The catalyst systems used herein may be characterized as supported catalyst systems or as unsupported catalyst systems, sometimes referred to as homogeneous catalysts. The catalyst systems may be metallocene catalyst systems, Ziegler-Natta catalyst systems or other catalyst systems known to one skilled in the art for the production of polyolefins, for example. A brief discussion of such catalyst systems is included below, but is in no way intended to limit the scope of the invention to such catalysts.

A. Ziegler-Natta Catalyst System

Ziegler-Natta catalyst systems are generally formed from the combination of a metal component (e.g., a catalyst precursor) with one or more additional components, such as a catalyst support and/or a cocatalyst. One or more electron donors may optionally be present.

A specific example of a catalyst precursor is a metal component generally represented by the formula:

$MR_x$;

where M is a transition metal, R is a halogen, an alkoxy, or a hydrocarboxyl group and x is the valence of the transition metal. For example, x may be from 1 to 4. The transition metal of the Ziegler-Natta catalyst compound, as described throughout the specification and claims, may be selected from Groups IV through VIB in one embodiment and selected from titanium, chromium, or vanadium in a more particular embodiment. R may be selected from chlorine, bromine, carbonate, ester, or an alkoxy group in one embodiment. Examples of catalyst precursors include, but are not necessarily limited to, $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$.

Those skilled in the art will recognize that a catalyst is "activated" in some way before it is useful for promoting polymerization. As discussed further below, activation may be accomplished by combining the catalyst with an activator, which is also referred to in some instances as a "cocatalyst." As used herein, the term "Z-N activator" refers to any compound or combination of compounds, supported or unsupported, which may activate a Z-N catalyst precursor. Embodiments of such activators include, but are not necessarily limited to, organoaluminum compounds, such as trimethyl aluminum (TMA), triethyl aluminum (TEAl) and triisobutyl aluminum (TiBAl), for example. The Ziegler-Natta catalyst system may further optionally include one or more electron donors, such as internal electron donors and/or external electron donors. Internal electron donors may be used to reduce the atactic form of the resulting polymer, thus decreasing the amount of xylene solubles in the polymer.

The components of the Ziegler-Natta catalyst system (e.g., catalyst precursor, activator and/or optional electron donors) may or may not be associated with a support, either in combination with each other or separate from one another. Typical support materials may include a magnesium dihalide, such as magnesium dichloride or magnesium dibromide, for example.

Ziegler-Natta catalyst systems and processes for forming such catalyst systems are described in at least U.S. Pat. Nos. 4,298,718; 4,544,717 and 4,767,735, which are incorporated by reference herein.

B. Metallocene Catalyst System

Metallocene catalysts may be characterized generally as coordination compounds incorporating one or more cyclopentadienyl (Cp) groups (which may be substituted or unsubstituted, each substitution being the same or different) coordinated with a transition metal through π bonding.

The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

$[L]_mM[A]_n$;

where L is a bulky ligand, A is a leaving group, M is a transition metal and m and n are such that the total ligand valency corresponds to the transition metal valency. For example m may be from 1 to 3 and n may be from 1 to 3.

The metal atom "M" of the metallocene catalyst compound, as described throughout the specification and claims, may be selected from Groups 3 through 12 atoms and lanthanide Group atoms in one embodiment, selected from Groups 3 through 10 atoms in a more particular embodiment, selected from Sc, Ti, Zr, Hf, V, Nb, Ta, Mn, Re, Fe, Ru, Os, Co, Rh, Ir, and Ni in yet a more particular embodiment, selected from Groups 4, 5 and 6 atoms in yet a more particular embodiment, Ti, Zr, Hf atoms in yet a more particular embodiment and Zr in yet a more particular alternate embodiment. The oxidation state of the metal atom "M" may range from 0 to +7 in one embodiment, in a more particular embodiment, is +1, +2, +3, +4 or +5 and in yet a more particular embodiment is +2, +3 or +4. The groups bounding the metal atom "M" are such that the compounds described below in the formulas and structures are electrically neutral, unless otherwise indicated.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

Cp typically includes fused ring(s) or ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl or $H_4Ind$), substituted versions thereof and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkyl-amines, alkylamidos, alkoxycarbonyls, aryloxycarbonyls, carbomoyls, alkyl- and dialkyl-carbamoyls, acyloxys, acylaminos, aroylaminos and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like, halocarbyl-substituted organometalloid radicals including tris(trifluoromethyl)silyl, methylbis(difluoromethyl)silyl, bromomethyldimethylgermyl and the like, disubstituted boron radicals including dimethylboron for example, disubstituted Group 15 radicals including dimethylamine, dimethylphosphine, diphenylamine, methylphenylphosphine and Group 16 radicals including methoxy, ethoxy, propoxy, phenoxy, methylsulfide and ethylsulfide. Other substituents R include olefins, such as but not limited to, olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from carbon, nitrogen, oxygen, phosphorous, silicon, germanium, aluminum, boron and combinations thereof. Also, a substituent group R group such as 1-butanyl, may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, $C_1$ to $C_{12}$ heteroatom-containing hydrocarbons and substituted derivatives thereof, hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls and $C_7$ to $C_{18}$ fluoroalkylaryls in yet a more particular embodiment, hydride, chloride, fluoride, methyl, phenyl, phenoxy, benzoxy, tosyl, fluoromethyls and fluorophenyls in yet a more particular embodiment, $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls, $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment, chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls and halogenated $C_7$ to $C_{18}$ alkylaryls in yet a more particular embodiment, fluoride, methyl, ethyl, propyl, phenyl, methylphenyl, dimethylphenyl, trimethylphenyl, fluoromethyls (mono-, di- And trifluoromethyls) and fluorophenyls (mono-, di-, tri-, tetra- and pentafluorophenyls) in yet a more particular embodiment and fluoride in yet a more particular embodiment.

Other non-limiting examples of leaving groups include, but are not necessarily limited to, amines, phosphines, ethers, carboxylates, dienes, hydrocarbon radicals having from 1 to 20 carbon atoms, fluorinated hydrocarbon radicals (e.g., $-C_6F_5$ (pentafluorophenyl)), fluorinated alkylcarboxylates (e.g., $CF_3C(O)O^-$), hydrides, halogen ions and combinations thereof. Other examples of leaving groups include, but are not necessarily limited to, alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one non-limiting embodiment, two or more leaving groups form a part of a fused ring or ring system.

L and A may be bridged to one another. A bridged metallocene, for example may, be described by the general formula:

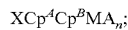

wherein X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to, at least one of a carbon, oxygen, nitrogen, silicon, aluminum, boron, tin and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging groups are represented by $C_1$ to $C_6$ alkylenes, substituted $C_1$ to $C_6$ alkylenes, oxygen, sulfur, $R_2C=$, $R_2Si=$, $-Si(R)_2Si(R_2)-$ and $R_2Ge=$, $RP=$ (wherein "$=$" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms and halogen radicals and wherein two or more Rs may be joined to form a ring or ring system. In one embodiment, the bridged metallocene catalyst component has two or more bridging groups (X).

As used herein, the term "metallocene activator" is defined to be any compound or combination of compounds, supported or unsupported, which may activate a single-site catalyst compound (e.g., metallocenes, Group 15 containing catalysts, etc.) Typically, this involves the abstraction of at least one leaving group (A group in the formulas/structures above, for example) from the metal center of the catalyst component. The catalyst components herein are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, it is within the scope herein to use Lewis acids such as alumoxane (e.g., "MAO"), modified alumoxane (e.g., "TIBAO") and alkylaluminum compounds as activators, to activate desirable metallocenes described herein. MAO and other aluminum-based activators are well known in the art. Non-limiting examples of aluminum alkyl compounds which may be utilized as activators for the catalysts described herein include trimethylaluminum, triethylaluminum, triisobutylaluminum, tri-n-hexylaluminum, tri-n-octylaluminum and the like.

Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds and mixtures thereof (e.g., tri(n-butyl)ammonium tetrakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one non-limiting embodiment, the three groups are independently selected from the group of halogen, mono or multicyclic (including halosubstituted) aryls, alkyls, alkenyl compounds and mixtures thereof In another embodiment, the three groups are selected from the group alkenyl groups having 1 to 20 carbon atoms, alkyl groups having 1 to 20 carbon atoms, alkoxy groups having 1 to 20 carbon atoms, aryl groups having 3 to 20 carbon atoms (including substituted aryls) and combinations thereof. In yet another embodiment, the three groups are selected from the group of alkyls having 1 to 4 carbon groups, phenyl, naphthyl and mixtures thereof. In yet another embodiment, the three groups are selected from the group of highly halogenated alkyls having 1 to 4 carbon groups, highly halogenated phenyls, highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

The activators may or may not be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) *CHEMICAL REVIEWS* 1347-1374 (2000).

Metallocene catalysts may be supported or unsupported. Typical support materials may include, but are not necessarily limited to, talc, inorganic oxides, clays and clay minerals, ion-exchanged layered compounds, diatomaceous earth compounds, zeolites or a resinous support material, such as a polyolefin.

Specific inorganic oxides include, but are not necessarily limited to, silica, alumina, magnesia, titania and zirconia, for example. The inorganic oxides used as support materials may have an average particle size of from 30 microns to 600 microns or from 30 microns to 100 microns, a surface area of from 50 m$^2$/g to 1,000 m$^2$/g or from 100 m$^2$/g to 400 m$^2$/g and a pore volume of from 0.5 cc/g to 3.5 cc/g or from 0.5 cc/g to 2 cc/g. Desirable methods for supporting metallocene ionic catalysts are described in U.S. Pat. Nos. 5,643,847; 6,228,795 and 6,143,686, which are incorporated by reference herein.

Polymerization Processes

As indicated elsewhere herein, catalyst systems are used to make polyolefin compositions. Once the catalyst system is prepared, as described above and/or as known to one skilled in the art, a variety of processes may be carried out using that composition. Among the varying approaches that may be used include, but are not necessarily limited to, procedures set forth in U.S. Pat. No. 5,525,678, incorporated by reference herein. The equipment, process conditions, reactants, additives and other materials will of course vary in a given process, depending on the desired composition and properties of the polymer being formed. For example, the processes of U.S. Pat. Nos. 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735 and 6,147,173 may be used and are incorporated by reference herein.

The catalyst systems described above may be used in a variety of polymerization processes, over a wide range of temperatures and pressures. The temperatures may be in the range of from about −60° C. to about 280° C., or from about 50° C. to about 200° C. and the pressures employed may be in the range of from 1 atmosphere to about 500 atmospheres or higher (about 0.1 MPa to about 50.7 MPa).

Polymerization processes may include solution, gas phase, slurry phase, high pressure processes or a combination thereof.

In certain embodiments, the process herein is directed toward a solution, high pressure, slurry or gas phase polymerization process of one or more olefin monomers having from 2 to 30 carbon atoms, or from 2 to 12 carbon atoms or from 2 to 8 carbon atoms, such as ethylene, propylene, butane, pentene, methylpentene, hexane, octane and decane. Other monomers include, but are not necessarily limited to, ethylenically unsaturated monomers, diolefins having from 4 to 18 carbon atoms, conjugated or nonconjugated dienes, polyenes, vinyl monomers and cyclic olefins. Non-limiting monomers may include norbornene, norbornadiene, isobutylene, isoprene, vinylbenzocyclobutane, sytrenes, alkyl substituted styrene, ethylidene norbornene, dicyclopentadiene, and cyclopentene. In one non-limiting embodiment, a copolymer is produced, such as propylene/ethylene, or a terpolymer is produced. Examples of solution processes are described in U.S. Pat. Nos. 4,271,060; 5,001,205; 5,236,998 and 5,589,555, which are incorporated by reference herein.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,456,471; 5,462,999; 5,616,661 and 5,668,228, which are incorporated by reference herein.)

The reactor pressure in a gas phase process may vary from about 100 psig to about 500 psig (about 0.7 to about 3.4 MPa), or from about 200 psig to about 400 psig or from about 250 psig to about 350 psig (about 1.7 to about 2.4 MPa), for example. The reactor temperature in a gas phase process may vary from about 30° C. to about 120° C., or from about 60° C. to about 115° C., or from about 70° C. to about 110° C. or from about 70° C. to about 95° C. Other gas phase processes contemplated by the process includes those described in U.S. Pat. Nos. 5,627,242; 5,665,818 and 5,677,375, which are incorporated by reference herein.

Slurry processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components may be separated from the polymer and recycled, optionally after a distillation, to the reactor. The liquefied diluent employed in the polymerization medium is typically an alkane having from 3 to 7 carbon atoms, such as a branched alkane. The medium employed is generally liquid under the conditions of polymerization and relatively inert. Such as hexane or isobutene.

In a specific embodiment, a slurry process or a bulk process (e.g., a process without a diluent) may be carried out continuously in one or more loop reactors. The catalyst, as a slurry or as a dry free flowing powder, may be injected regularly to the reactor loop, which may itself be filled with circulating slurry of growing polymer particles in a diluent. Hydrogen, optionally, may be added as a molecular weight control. The reactor may be maintained at a pressure of from about 27 bar to about 45 bar and a temperature of from about 38° C. to about 121° C., for example. Reaction heat may be removed through the loop wall since much of the reactor is in the form of a double-jacketed pipe. The slurry may exit the reactor at regular intervals or continuously to a heated low pressure flash vessel, rotary dryer and a nitrogen purge column in sequence for removal of the diluent and all unreacted monomer and comonomers. The resulting hydrocarbon free powder may then be compounded for use in various applications. Alternatively, other types of slurry polymerization processes may be used, such stirred reactors is series, parallel or combinations thereof.

It is known that an increase in the molecular weight normally improves the physical properties of polyethylene resins, and thus there is a strong demand for polyethylene having high molecular weight. However, it is the high molecular weight molecules which render the polymers more difficult to process. On the other hand, a broadening in the molecular weight distribution tends to improve the flow of the polymer when it is being processed at high rates of shear. Accordingly, in applications requiring a rapid transformation employing quite high inflation of the material through a die, for example in blowing and extrusion techniques, the broadening of the molecular weight distribution permits an improvement in the processing of polyethylene at high molecular weight (this being equivalent to a low melt index, as is known in the art). It is known that when the polyethylene has a high molecular weight and also a wide molecular weight distribution, the processing of the polyethylene is made easier as a result of the low molecular weight portion and also the high molecular weight portion contributes to a good impact resistance for the polyethylene film. A polyethylene of this type may be processed utilizing less energy with higher processing yields.

The molecular weight distribution may be completely defined by means of a curve obtained by gel permeation chromatography. Generally, the molecular weight distribution is defined by a parameter, known as the dispersion index D, which is the ratio between the average molecular weight by weight (Mw) and the average molecular weight by number (Mn). The dispersion index constitutes a measure of the width of the molecular weight distribution.

It is known in the art that it is not possible to prepare a polyethylene having a broad molecular weight distribution and the required properties simply by mixing polyethylenes having different molecular weights. As discussed above, high density polyethylene consists of high and low molecular weight fractions. The high molecular weight fraction provides good mechanical properties to the high density polyethylene and the low molecular weight fraction is required to give good processability to the high density polyethylene, the high molecular weight fraction having relatively high viscosity which can lead to difficulties in processing such a high molecular weight fraction. In a bimodal high density polyethylene, the mixture of the high and low melting weight fractions is adjusted as compared to a monomodal distribution so as to increase the proportion of high molecular weight species in the polymer. This can provide improved mechanical properties.

It is thus understood that it is desirable to have a bimodal distribution of molecular weight in the high density polyethylene. For a bimodal distribution a graph of the molecular weight distribution as determined for example by gel permeation chromatography, may for example include in the curve a "shoulder" on the high molecular weight side of the peak of the molecular weight distribution.

The manufacture of bimodal polyethylene is known in the art. It is known that in order to achieve a bimodal distribution, which reflects the production of two polymer fractions, having different molecular weights, two catalysts are required which provide two different catalytic properties and establish two different active sites. Those two sites in turn catalyze two reactions for the production of the two polymers to enable the bimodal distribution to be achieved. Currently, as has been known for many years, the commercial production of bimodal high density polyethylene is carried out by a two step process, using two reactors in series. In the two step process, the process conditions and the catalyst can be optimized in order to provide a high efficiency and yield for each step in the overall process.

It is known to use a Ziegler-Natta catalyst to produce polyethylene having a bimodal molecular weight distribution in a two stage polymerization process in two liquid full loop reactors in series. In the polymerization process, the comonomer is fed into the first reactor and the high and low molecular weight polymers are produced in the first and second reactors respectively. The introduction of comonomer into the first reactor leads to the incorporation of the comonomer into the polymer chains in turn leading to the relatively high molecular weight fraction being formed in the first reactor. In contrast, no comonomer is deliberately introduced into the second reactor and instead a relatively higher concentration of hydrogen is present in the second reactor to enable the low molecular weight fraction to be formed therein. In the alternative, another example of a multiple loop process that can employ the present methods and additives is a double loop system in which the first loop produces a polymerization reaction in which the resulting polyolefin has a lower MW than the polyolefin produced from the polymerization reaction of the second loop, thereby producing a resultant resin having broad molecular weight distribution and/or bimodal characteristics.

Further details about the production of bimodal or multimodal resins may be found in U.S. Pat. No. 6,221,982 and U.S. patent application Ser. No. 10/667,578, now allowed, published as U.S. Patent Application Publication 2004/0058803 A1, incorporated in its entirety by reference herein.

Polymer Product

The polymers produced by the processes described herein may be used in a wide variety of products and end-use applications. The polymers may include linear low density polyethylene, high density polyethylenes, low density polyethylenes, medium density polyethylenes, polypropylene and polypropylene copolymers.

Further, the process may include coextruding additional layers to form a multiplayer film. The additional layers may be any coextrudable, film known in the art, such as, low density polyethylene, linear low density polyethylene, medium density polyethylene, high density polyethylene, ethylene-propylene copolymers, butylenes-propylene copolymers, ethylene-butylene copolymers, ethylene-propylene-butylene terpolymers, ethylene-vinyl acetate copolymers, ethylene-vinyl alcohol copolymers, nylons etc.

In order to modify or enhance certain properties of the films for specific end-uses, it is possible for one or more of the layers to contain appropriate additives in effective amounts. The additives may be employed either in the application phase or may be combined with the polymer during the processing phase (pellet extrusion), for example. Such additives may include, but are not necessarily limited to, stabilizers (e.g., phosphates, phosphites, and other stabilizers known to those skilled in the art) to protect against UV degradation, thermal or oxidative degradation and/or actinic degradation and other forms of degradation, antistatic agents (e.g., medium to high molecular weight polyhydric alcohols and tertiary amines), anti-blocks, anti-oxidants, coefficient of friction modifiers, processing aids, colorants, clarifiers and other additives known to those skilled in the art.

Color Reducing Additives

It has been discovered that the use of certain additives reduces yellow color in polyethylene that is extruded with radical initiators. As noted elsewhere peroxides and sometimes oxygen are added in order to induce the formation of LCB, to improve processing performance and to increase the blown film bubble stability of bimodal polyethylene material and. In one non-limiting embodiment, the proportion range of peroxide may be from 5 to 100 ppm, based on the total resin weight, alternatively from about 10 to 30 ppm. Suitable color reducing additives include, but are not necessarily limited to, polyols such as polyethylene glycol (PEG), poly(propylene) glycol (PPG), alcohols, glycols, and/or water and neutralizing species such as a stearate, e.g. calcium stearate, calcium oxide and zinc oxide.

When a polyethylene is extruded with radical initiators, the Yellow Index (YI) of the polymer may be reduced by using one or more the following approaches. The incorporation of polyols such as PEG, PPG, alcohols, glycols, and/or water in the free radical-modified material reduces the YI. For instance, adding 200 ppm of PEG in a bimodal polyethylene with 10 ppm of peroxide allowed reducing the color by several points on the YI scale. Water may be introduced as steam. More specifically, the alcohols, glycols, polyols may include, but are not necessarily limited to, PEG, sorbitol, mannitol, glycerol and water steam. Where the color-reducing additive is a PEG, alcohol, glycol, polyol, and/or water steam, the proportion of additive ranges from about 5 to 1000 ppm, based on the polymerization mixture, in one non-limiting embodiment, and alternatively ranges from about 100 to 300 ppm.

Further, the radical initiators introduced in the polyethylene material may react with some residues formed before the extrusion process to form yellow species. It has been found that when an appropriate type of chemical is used to neutralize these residues, the color of the resulting polyethylene is significantly reduced. Specifically, adequate amounts of neutralizing species including, but are not necessarily limited to, calcium stearate, calcium oxide or zinc oxide may decrease the color of a bimodal polyethylene modified in extrusion by radical initiator (e.g. oxygen or peroxides). In one non-restrictive instance, adding 1000 ppm of calcium stearate in a bimodal polyethylene modified with peroxide allowed reducing the yellow index from a positive 4 to a negative 0.5 on the YI scale.

Additional color-reducing additives include, but are not necessarily limited to, neutralizing species including alkali metal stearates, more specifically including, but not necessarily limited to, calcium stearate, magnesium stearate, zinc stearate, sodium stearate, potassium stearate, and mixtures thereof. In the case of the additive being stearate, the proportion of stearate used may range from about 300 to about 2000 ppm based on the polymerization mixture in one non-limiting embodiment, and alternatively may range from about 500 to about 1500 ppm.

In the case of the additive neutralizing species being calcium oxide or zinc oxide, the proportion of oxide used may range from about 300 to about 4000 ppm based on the polymerization mixture in one non-limiting embodiment, and alternatively may range from about 1000 to about 4000 ppm. It will be appreciated that the resulting polyethylene article, film or sheet material will have reduced color as compared with an identical polyethylene article, film or sheet material absent the additive.

Although the methods and compositions will be described herein with respect to high density polyethylene (HDPE), it will be appreciated that the teachings may be applied to other polymers, particularly other polyethylenes including, but not necessarily limited to medium density polyethylene (MDPE), low density polyethylene (LDPE), linear low density polyethylene (LLDPE), and the like.

The present methods and compositions are directed to applications of polyethylene resins in one particular embodiment, and in a particular non-limiting embodiment high density polyethylene (HDPE), and especially HDPE blown and extruded films, although the methods and compositions could be applied to HDPE blow-molded articles. The polyethylene resins herein may be applied in any "free surface" application, by which is meant any extrusion/molding process where the polymer exits a die and is for a brief period unconstrained before being molded or formed into a product. Thus, free surface applications include, but are not necessarily limited to, film blowing and extrusion, sheet extrusion, blow-molding, coating, etc. In one non-limiting embodiment, the HDPE resin herein is a high molecular weight HDPE (HMW-HDPE) homopolymer having a broad or narrow molecular weight distribution (MWD), and low shear thinning behavior.

As noted, the methods and compositions herein are expected to find particular application to branched HDPE homopolymers or copolymers, which may contain catalyst residues that may react and cause undesirable color in the resin, although it should be understood that the methods and compositions herein are not bound by any theory that color is caused by catalyst residue. The compositions and methods herein are expected to find particular use in polyethylenes which have had long chain branching (LCB) induced particularly by oxygen and peroxides). In one non-limiting embodiment herein, the base resin herein is very similar to those film grade resins described in U.S. patent application Ser. No. 09/896,917 (published as 2003/0030174) and U.S. Pat. No. 6,777,520, both filed Jun. 29, 2001, hereby incorporated by reference.

Generally, and in a more specific non-limiting embodiment, the MWD of the HDPE herein is about 15 or above. In one non-limiting alternative, the MWD is possibly between about 19 to about 23. The inventive concept herein is generally independent of density, however. In the context herein, the MWD refers to the MWD of a unimodal resin, or in the case of a bimodal resin refers to the MWD of the combined low and high molecular weight peaks thereof. It will be appreciated that the inventive methods and compositions herein are not limited to whether the resin is unimodal or bimodal.

In one non-limiting embodiment, the density of the HDPE may be between 0.947 and 0.962 g/cm$^3$, inclusive, and in another non-limiting, alternate embodiment may be between 0.950 and 0.954 g/cm$^3$. The HDPE generally has a melt index (MI$_2$) in the range of about 0.02 dg/min to about 0.5 dg/min, in one non-limiting, alternate embodiment from about 0.07 dg/min to about 0.3 dg/min, and in a further non-limiting, alternate embodiment from about 0.08 dg/min to about 0.25 dg/min. The HDPE is stable upon extrusion.

With respect to the non-limiting embodiment where the HDPE is high molecular weight (MMW) high density polyethylene (HDPE), the polyethylene is also made using catalysts already described and techniques already described or well known in the art. By "high molecular weight" is meant a molecular weight ranging from about 200,000-300,000 Mw or higher, and alternatively in another non-limiting embodiment ranging from about 240,000 Mw or higher. The melt flow index (MFI) at 190° C., 2.16 kg may range from about 0.04 to about 0.1 g/10 min, and alternatively from about 0.06 to about 0.08 g/10 min. The melting point of the HDPE may range from about 115 to about 135° C. in one non-limiting embodiment, and alternatively from about 120 to about 130° C. Suitable ZN HDPEs include, but are not necessarily limited to, high molecular weight bimodal HDPE available from TOTAL® Petrochemicals Inc. A proprietary catalyst system is used to manufacture HMW-HDPE film grades with exceptional properties including, but not necessarily limited to, low haze, high gloss, extremely low gel content and low taste and odor.

Another embodiment provides a process for polymerization of α-olefin monomers, wherein the monomers are generally ethylene. The polymerization process may be bulk, slurry or gas phase, although in one non-limiting embodiment, a slurry phase polymerization may be used, and in another non-limiting, alternate embodiment one or more loop reactors may be employed.

The reactor temperature is generally a temperature in the range of about 180° F. to about 230° F. (about 82 to about 110° C.). In another non-limiting, alternative embodiment, the reactor temperature is in the range of about 190° F. to about 225° F. (about 88 to about 107° C.), and in yet another non-limiting, alternative in the range of about 200° F. to about 220° F. (about 93 to about 104° C.). In one non-limiting embodiment, the aluminum cocatalyst levels may generally be in the range of about 10 ppm to about 300 ppm with respect to the diluent. In another non-restrictive embodiment, the cocatalyst levels are in the range of about 50 ppm to about 200 ppm with respect to the diluent, and in an alternate non-limiting embodiment are in the range of about 25 ppm to about 150 ppm.

The olefin monomer may be introduced into the polymerization reaction zone in a nonreactive heat transfer diluent agent that is liquid at the reaction conditions. Examples of such a diluent include, but are not necessarily limited to, hexane and isobutane. In one non-limiting embodiment, the diluent is isobutane.

Generally the polymer produced herein involves copolymerization of ethylene with another alpha-olefin, such as, for example, propylene, butene or hexene, the second alpha-olefin may be present at about 0.01-20 mole percent, in another non-limiting embodiment from about 0.02-10 mole percent.

It should be understood that peroxides and/or air are to be employed carefully to maintain control of the resin characteristics and ultimate film. It has been discovered that a resin additive such as peroxide and/or air (oxygen) may provide the necessary LCB needed to make a more processable material. In one non-limiting embodiment, the peroxide proportion ranges from about 2 to about 100 ppm by weight, based on the total resin. In an alternate non-limiting embodiment, the peroxide proportion may range from about 10 to about 100 ppm, alternatively from about 30 to about 60 ppm by weight, based on the total resin.

In one non-limiting embodiment, suitable peroxides include, but are not necessarily limited to, hydrogen peroxide, air, oxygen, peroxyketals, peroxyesters, hydroperoxides, dialkyl peroxides and generally any free radical initiator. LUPERSOL® 101 (available from Arkema) is one non-limiting, specific example.

No special technique is needed to introduce the additive to the polymerization mixture, and it is expected that the color-reducing additive may be added before, during and/or after free radical initiators are introduced.

The polymers may also contain various additives capable of imparting specific properties to the articles the resins are intended to produce. Additives known to those skilled in the art that may be used in these polymers include, but are not necessarily limited to, fillers such as talc and calcium carbonate, pigments, antioxidants, stabilizers, anti-corrosion agents, slip agents, UV stabilizing agents and antiblock agents, etc.

In further processing the polymers herein may be co-extruded with other resins to form multilayer films, although it should be understood that the methods and compositions herein also apply to monolayer films. The co-extrusion may be conducted according to methods well known in the art. Co-extrusion may be carried out by simultaneously pushing the polymer of the skin layer and the polymer of the core layer through a slotted or spiral die system to form a film formed of an outer layer of the skin polymer and substrate layer of the core polymer. Furthermore, the film or sheet materials may be laminated with other materials after extrusion as well. Again, known techniques in laminating sheets and films may be applied to form these laminates.

Articles that may be wrapped with these extruded films or sheet structures include, but are not necessarily limited to, frozen foods, other foods, urban refuse, fresh cut produce, detergent bags, towel overwrap, and the like.

The methods, resins, fibers, films and structures discussed herein will now be described further with respect to actual Examples that are intended simply to further illustrate the concept and not to limit it in any way.

EXAMPLES

Materials

Several compounds were created based on a particular high molecular weight bimodal HDPE fluff. These compounds detailed in Table I and Table II, which generate the input for two designs of experiments (DOEs), one with calcium stearate (CaSt) and one with zinc oxide. A refined study of the influence of CaSt and PEG was done after the analysis of the DOEs and described in Table III. A refined study of the influence of zinc oxide in the material is detailed in Table IV. Finally, the influence of calcium stearate with and without air in the material was assessed with the experiments described in Tables V and VI. All the compounds included 1000-ppm of IRGAFOS 168 and 10-ppm of peroxide, except those in Tables V and VI that do not contain peroxide. One objective was to determine the influence of CaSt, zinc oxide, IRGANOX 1010, PEG and VITON Freeflow Z100 fluoropolymer on the yellow index of the high molecular weight bimodal HDPE material.

IRGANOX® 1010 phenolic-based antioxidant is available from Ciba Specialty Chemicals and is used to terminate free radicals against overbake yellowing. VITON® Free Flow Z100 fluoropolymer processing aid is available from DuPont Dow Elastomers. IRGAFOS® 168 is a hydrolytically stable phosphite, available from Ciba Specialty Chemicals and is used to improve retention of color and polymer properties during production.

TABLE I

DOE with CaSt

| Viton Z100, ppm | Irganox 1010, ppm | CaSt, ppm |
|---|---|---|
| 0 | 500 | 4000 |
| 100 | 500 | 0 |
| 50 | 0 | 4000 |
| 0 | 1000 | 2000 |
| 100 | 0 | 2000 |
| 50 | 500 | 2000 |
| 100 | 1000 | 4000 |
| 50 | 1000 | 0 |
| 0 | 0 | 0 |

TABLE II

DOE with Zinc Oxide

| Viton Z100, ppm | Irganox 1010, ppm | zinc oxide, ppm |
|---|---|---|
| 0 | 500 | 600 |
| 100 | 500 | 0 |
| 50 | 0 | 600 |
| 0 | 1000 | 300 |
| 100 | 0 | 300 |
| 50 | 500 | 300 |
| 100 | 1000 | 600 |
| 50 | 1000 | 0 |
| 0 | 0 | 0 |

TABLE III

Optimization of CaSt and Use of PEG in the Material

| Irgafos 168, ppm | Irganox 1010, ppm | CaSt, ppm | PEG, ppm |
|---|---|---|---|
| 1000 | 500 | 0 | 0 |
| 1000 | 500 | 500 | 0 |
| 1000 | 500 | 1000 | 0 |
| 1000 | 500 | 1500 | 0 |
| 1000 | 500 | 2500 | 0 |
| 1000 | 500 | 2500 | 200 |

TABLE IV

Optimization of Zinc Oxide in the Material

| Irgafos 168, ppm | Irganox 1010, ppm | zinc oxide, ppm |
|---|---|---|
| 1000 | 500 | 0 |
| 1000 | 500 | 2000 |
| 1000 | 500 | 4000 |

TABLE V

Influence of CaSt and Air in the Material

| Irgafos 168, ppm | Irganox 1010, ppm | CaSt, ppm |
|---|---|---|
| 1000 | 500 | 0 |
| 1000 | 500 | 2000 |
| 1000 | 500 | 4000 |

TABLE VI

Influence of CaSt in the Material Without Radical Initiator

| Irgafos 168, ppm | Irganox 1010, ppm | CaSt, ppm |
|---|---|---|
| 1000 | 500 | 0 |
| 1000 | 500 | 2000 |
| 1000 | 500 | 4000 |

Experimental Procedure

The pellet samples were compounded with a twin screw Brabender extruder (see Table VII). Given the batch size used in this study (5 pounds (2.3 kg)), the peroxide amount was about 10 ppm.

TABLE VII

Brabender Scaled Conditions

| | |
|---|---|
| Screen pack, mesh | 150 |
| Die temperature, ° C. | 215 |
| Screw speed, rpm | 50 |
| Feed, % | 100 |

The materials were analyzed for yellow index (YI) immediately after extrusion and again after aging 18 or 24 hours under 75° C.

Results

FIG. 1 shows the average YI of the DOEs. The CaSt runs have a little lower YI on average. Oxygen is very detrimental to the YI when peroxide is in the material, leading to YI of around +20, as seen in the two right-most plots.

Figure 2:
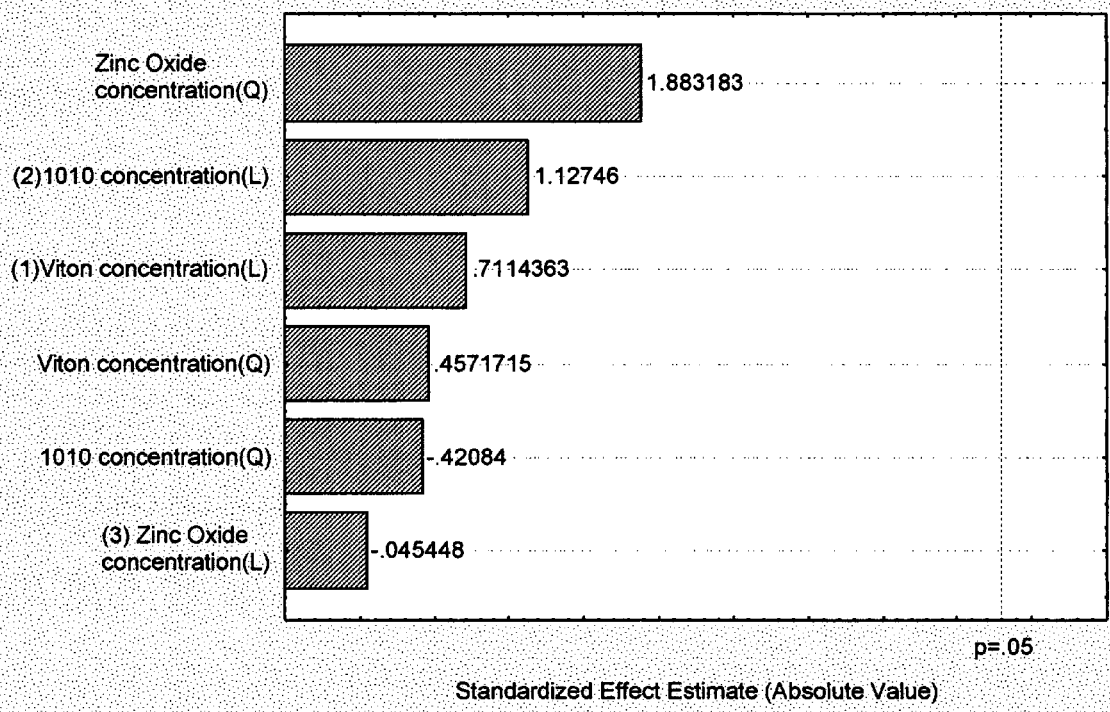
FIG. 2 shows a Pareto diagram for the zinc oxide DOEs; replace throughout.

FIG. 2 displays the Pareto diagram of the influence of zinc oxide in the DOE. None of the parameters exhibit a significant influence on the color. The smallest residual in the analysis of variance (ANOVA) indicates a confidence interval at best 80%.

Figure 3:
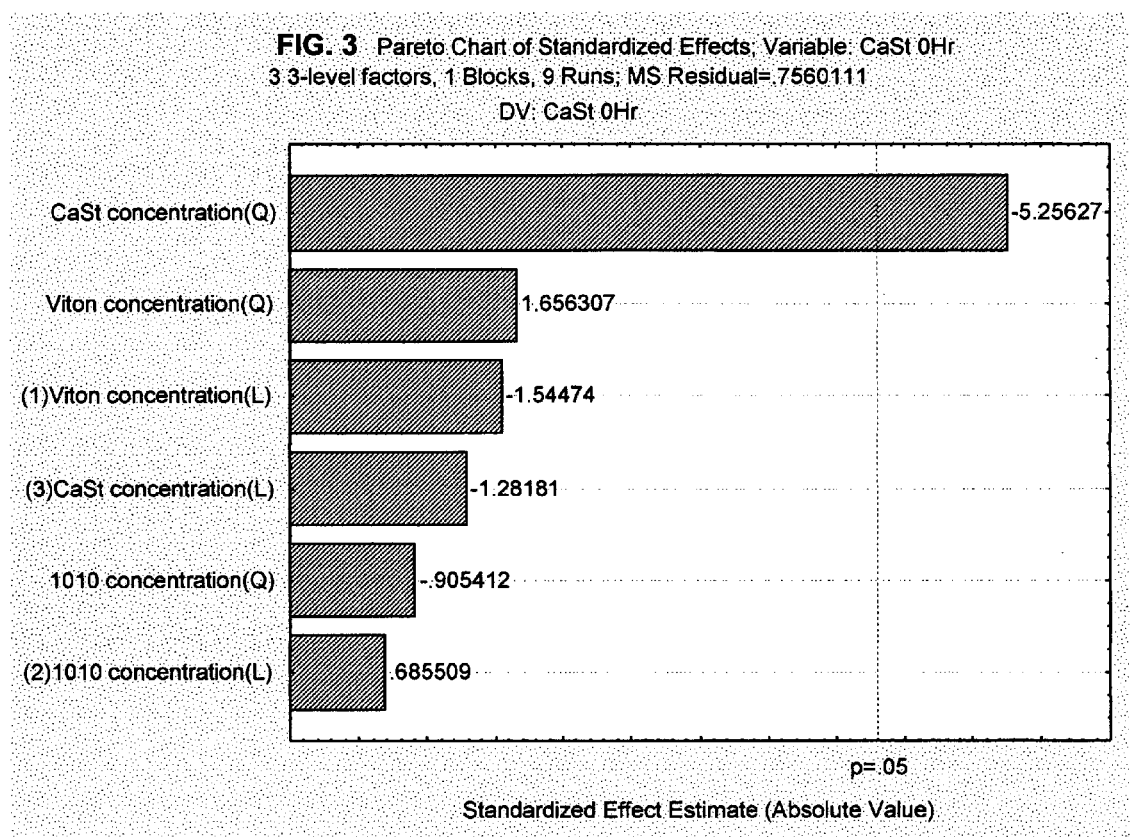
FIG. 3 is a Pareto diagram for the calcium stearate DOEs.

FIG. 3 exhibits the influence of the input parameters on the YI for the CaSt DOE. Like in FIG. 1, the Irganox 1010 and Viton Z100 concentration do not exhibit signs of significant influence on the YI. However, as seen in the first, top-most bar, the CaSt concentration has a 97% probability to change the Yellow Index.

Calcium stearate may contribute to the neutralization of the co-catalyst residues and thus decrease the Yellow Index down to a minimum. Once the necessary quantity of CaSt is reached to neutralize the residues, a more excessive amount will result in color increase due to the yellow species generated by this additive. Further optimization of the CaSt level may be achieved with additional research.

Figure 4:
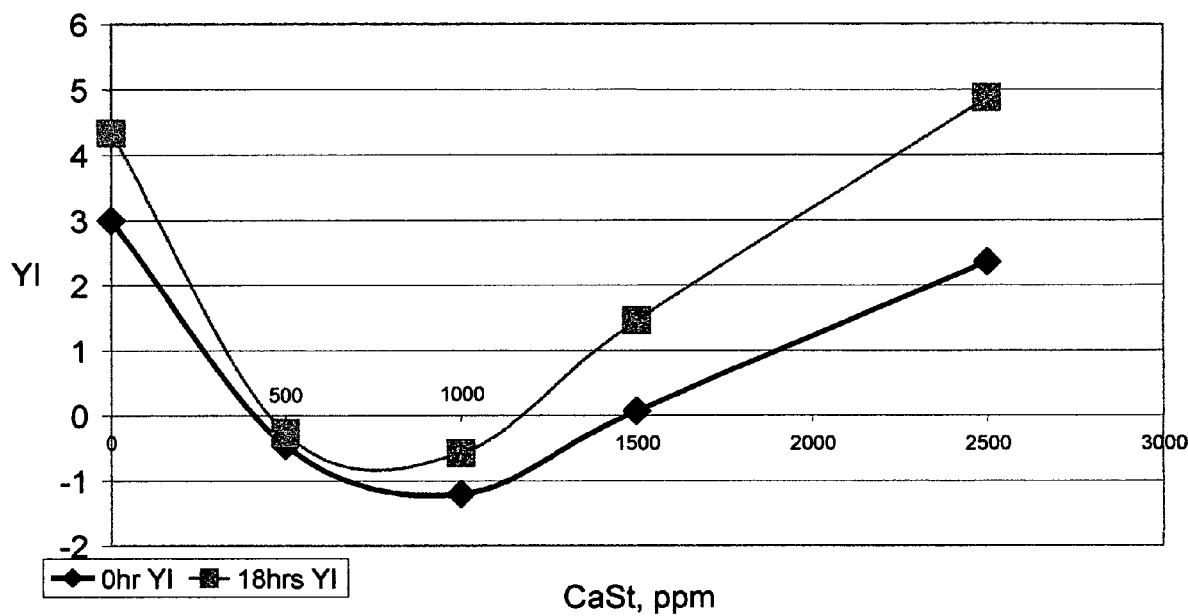
FIG. 4 is a graph of the Yellow Index vs. calcium stearate non-DOE optimization.

FIG. 4 displays an optimization of the CaSt content in the high molecular weight bimodal HDPE material. Calcium stearate may contribute to the neutralization of the co-catalyst residues and thus decrease the Yellow Index down to a minimum. Once the necessary quantity of CaSt is reached to neutralize the residues, a more excessive amount will result in color increase due to the yellow species generated by this additive. Further optimization of the CaSt level may be achieved with additional research. The more refined ppm sweep allows location of the optimal amount to incorporate in the material of about 1000 ppm.

Figure 5:
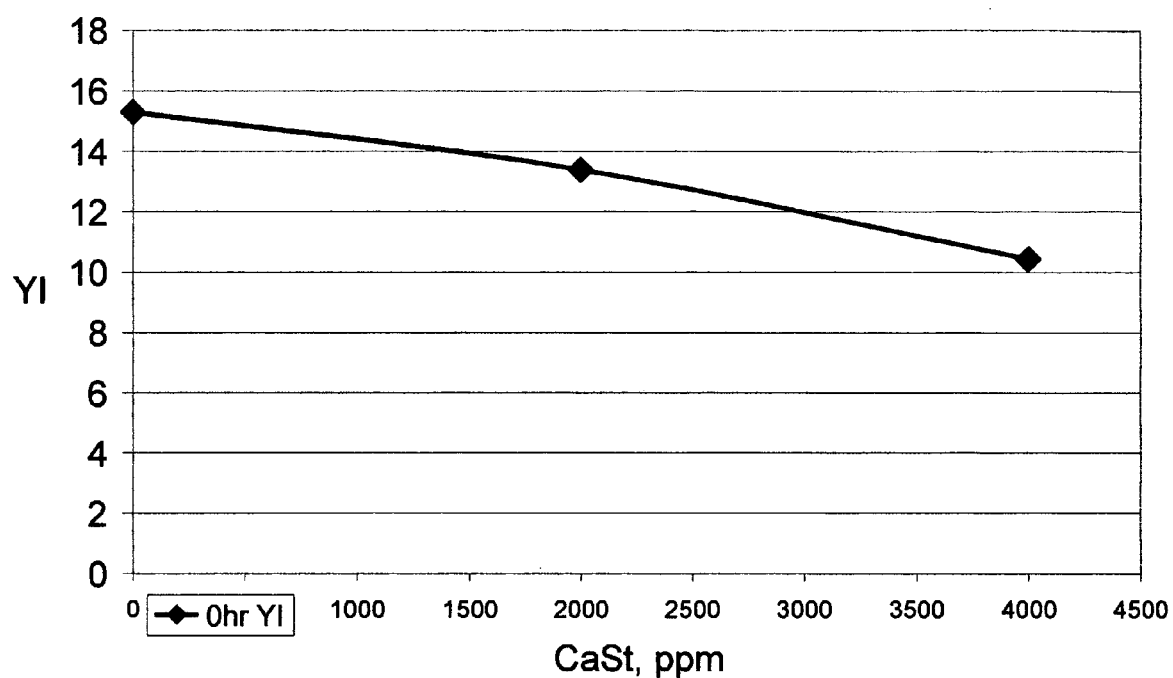
FIG. 5 is a graph showing the influence of calcium stearate on the Yellow Index in polyethylene materials where oxygen is present as a free radical initiator.
Figure 6:
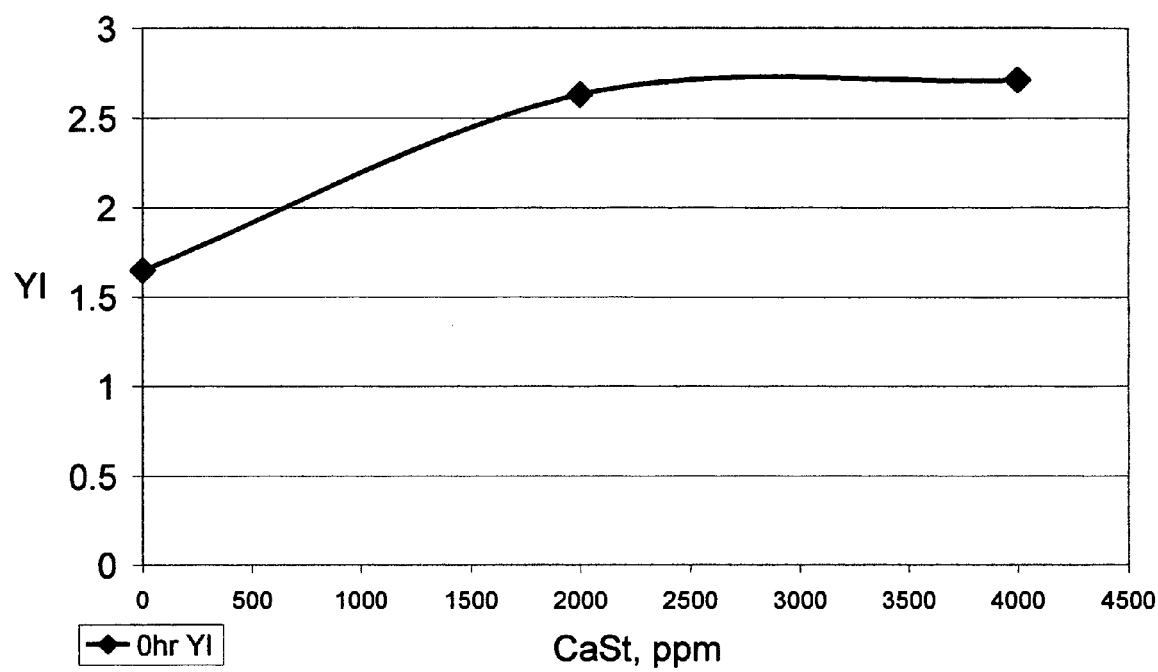
FIG. 6 is a graph showing the influence of calcium stearate on the Yellow Index in polyethylene materials without oxygen or peroxy-radicals.

The graphs of FIGS. 5 and 6 exhibit the influence of the calcium stearate concentration in presence of oxygen as a radical initiator and without any radical initiator, respectively. In presence of oxygen (FIG. 5), the Yellow Index diminishes as the concentration of CaSt increases. However, when no radical initiators were included in the material, the color of the compound increases with the CaSt ppm amount (FIG. 6).

These observations further support the hypothesis that yellow species are created via the reaction of radical initiators and the catalyst residues. Neutralizing the catalyst residues will lead to decreasing the color in presence of initiators.

Figure 7:
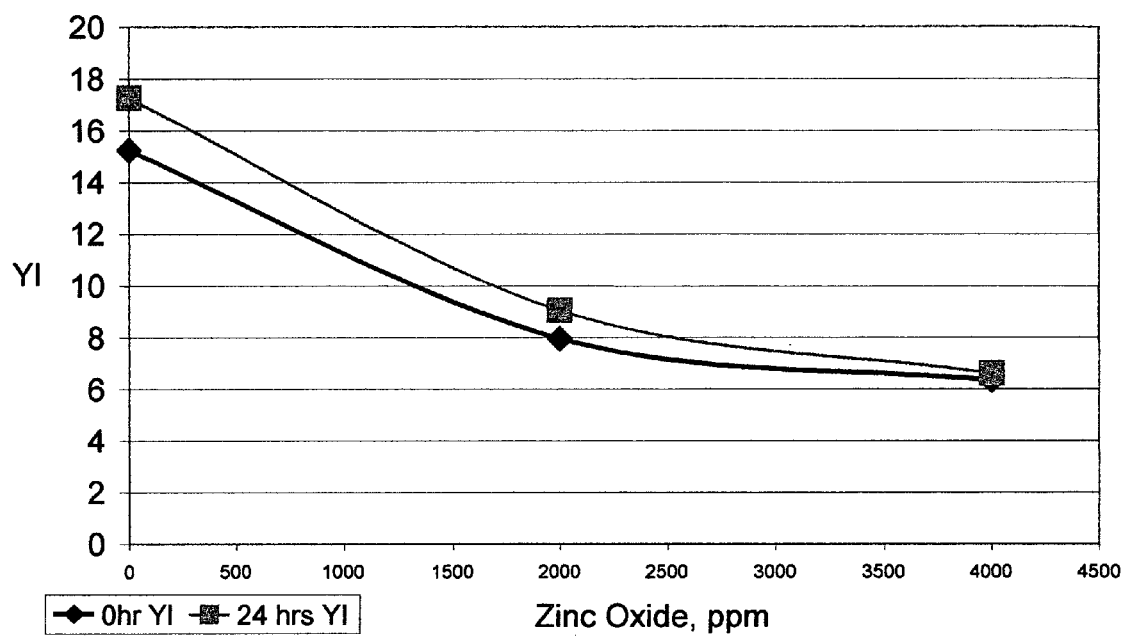
FIG. 7 is a graph of the influence of zinc oxide on the Yellow Index in concentrations above 1000 ppm.

FIG. 7 shows the Yellow Index of the materials versus the zinc oxide concentration. The YI decreases for zinc oxide ppm amounts above 1000. The stoichiometric target to get adequate neutralization for zinc oxide is about 300 ppm. This target appears to be under-evaluated. It is possible that as zinc oxide is not soluble, and that more is needed to statistically enter into contact with catalyst residues and neutralize them.

FIG. 8 exhibits the YI of two high molecular weight bimodal HDPE-based compounds with and without PEG. It may be readily seen that PEG helps lower the yellow index.

A number of conclusions may be drawn from these experiments:

Irganox 1010 and Viton Z100 do not exhibit a significant influence on color in the concentration range studied.

Increasing the level of zinc oxide by one order of magnitude above the stoichiometric level theoretically needed to neutralize the catalyst may decrease the YI.

There is a strong quadratic relationship between the CaSt concentration and the YI of the material, with a defined minimal in the range of about 1000 ppm.

Neutralizers appear to decrease the YI of the material specifically when radical initiators are present. When no radical initiators are introduced in the resin, the color tends to increase with increasing amounts of neutralizer.

200-ppm PEG helps decrease the color of the compounds used in this project.

In the foregoing specification, the films, sheet structures and methods have been described with reference to specific embodiments thereof, and has been demonstrated as effective in providing methods for preparing polyethylene having improved color. However, it will be evident that various modifications and changes may be made thereto without departing from the scope of the invention as set forth in the appended claims. Accordingly, the specification is to be regarded in an illustrative rather than a restrictive sense. For example, specific combinations or proportions of monomers, free radical initiators, additives and other components falling within the claimed parameters, but not specifically identified or tried in a particular polyethylene, are anticipated and expected to be within the scope of this invention. Further, these methods are expected to work at other conditions, particularly extrusion and blowing conditions, than those exemplified herein.

What is claimed is:

1. A method for producing polyethylene having reduced color comprising polymerizing ethylene monomer in the presence of at least one free radical initiator as a polymerization mixture; and incorporating into the polymerization mixture an amount effective to reduce a yellow index of a polyethylene product an additive selected from the group consisting of alcohols, glycols, and water steam, and a neutralizing species selected from the group consisting of alkali metal stearates, alkali earth metal stearates, zinc stearate, calcium oxide and zinc oxide and combinations thereof.

2. The method of claim 1 where the free radical initiator is selected from the group consisting of oxygen and peroxides.

3. The method of claim 1 where the proportion of additive is between about 5 and about 1000 ppm when the additive is alcohol, glycol, polyol or water steam, between about 300 to about 2000 ppm when the additive is a stearate, and between about 300 to about 4000 ppm when the additive is zinc oxide or calcium oxide, based on the polymerization mixture.

4. The method of claim 1 where the polyethylene product has reduced color as compared with an identical polyethylene product absent the additive.

5. The method of claim 1 where the alkali earth metal stearate is calcium stearate.

6. The method of claim 1 further comprising blowing a film of the polyethylene.

7. A method for producing polyethylene having reduced color comprising polymerizing ethylene monomer in the presence of at least one free radical initiator as a polymerization mixture; and incorporating into the polymerization mixture an additive selected from the group consisting of alcohols, glycols, and water steam, in a proportion between about 5 and about 1000 ppm, a stearate selected from the group consisting of alkali metal stearates, alkali earth metal stearates, zinc stearate, in a proportion between about 300 to about 2000 ppm, and zinc oxide or calcium oxide in a proportion between about 300 to about 4000 ppm; all based on the polymerization mixture; where the polyethylene product has reduced yellow index as compared with an identical polyethylene product absent the additive.

8. The method of claim 7 where the free radical initiator is selected from the group consisting of oxygen and peroxides.

* * * * *

UNITED STATES PATENT AND TRADEMARK OFFICE
CERTIFICATE OF CORRECTION

PATENT NO.        : 7,683,137 B2                                    Page 1 of 1
APPLICATION NO.   : 11/174854
DATED             : March 23, 2010
INVENTOR(S)       : Vincent Henri Barre et al.

It is certified that error appears in the above-identified patent and that said Letters Patent is hereby corrected as shown below:

Section (74) Attorney, Agent, or Firm:

"Terry", should read --Tenley--.

Signed and Sealed this

Eleventh Day of May, 2010

David J. Kappos
*Director of the United States Patent and Trademark Office*